INVENTOR
D. M. CHAPIN
BY
G. E. Hirsch Jr.
ATTORNEY

FIG. 3

| SECTORS | INNER RING | SECOND RING | OUTER RING |
|---|---|---|---|
| 1,5 | 00 | 11 | 00<br>01<br>11<br>10 |
| 2,6 | | 01 | 10<br>11<br>01<br>00 |
| 3,7 | | 00 | 00<br>01<br>11<br>10 |
| 4,8 | | 10 | 10<br>11<br>01<br>00 |
| 5,9 | 01 | 10 | 00<br>01<br>11<br>10 |
| 6,10 | | 11 | 10<br>11<br>01<br>00 |
| 7,11 | | 01 | 00<br>01<br>11<br>10 |
| 8,12 | | 00 | 10<br>11<br>01<br>00 |
| 9,13 | 11 | 00 | 00<br>01<br>11<br>10 |
| 10,14 | | 10 | 10<br>11<br>01<br>00 |
| 11,15 | | 11 | 00<br>01<br>11<br>10 |
| 12,16 | | 01 | 10<br>11<br>01<br>00 |
| 13,1 | 10 | 01 | 00<br>01<br>11<br>10 |
| 14,2 | | 00 | 10<br>11<br>01<br>00 |
| 15,3 | | 10 | 00<br>01<br>11<br>10 |
| 16,4 | | 11 | 10<br>11<br>01<br>00 |

INVENTOR
D. M. CHAPIN
BY G. E. Hirsch Jr.
ATTORNEY

INVENTOR
D. M. CHAPIN
BY C. E. Hirsch
ATTORNEY

CODE CONVERTER

Filed May 14, 1962 4 Sheets-Sheet 4

INVENTOR
D. M. CHAPIN
BY
G. E. Hirsch Jr.
ATTORNEY

United States Patent Office 3,229,280

Patented Jan. 11, 1966

3,229,280

CODE CONVERTER

Daryl M. Chapin, Basking Ridge, N.J., assignor to Bell Telephone Laboratories, Incorporated, New York, N.Y., a corporation of New York Filed May 14, 1962, Ser. No. 194,414

11 Claims. (Cl. 340—347)

This invention relates to code converters of the type which translate the instantaneous magnitude of a continuously variable electrical signal, or the relative rotational movement between two members, for example, into a discrete time sequence of electrical indications at a plurality of output terminals.

It is a general object of this invention to effect both a substantial improvement in and a simplification of various types of code converters as compared to those now commonly in use.

In many systems applications, such as those involving computers, communication circuits, or telemetering, it is often very desirable to convert time-variable information into digital form to facilitate accurate readout, transmission, or storage of such information. For such purposes, extremely accurate and high speed data acquisition apparatus is needed to match and exploit the capabilities of the particular system in which the apparatus is employed. Such apparatus normally involves the use of code converters, often referred to simply as coders, which generally operate on mechanical, magnetic, or optical principles to scan a code wheel or the like. Alternatively, electron beam scanning of a suitably apertured code mask in a cathode ray tube is often employed to effect the code conversion.

It has generally been the practice in converters utilizing rotatable code wheels, to utilize one code ring and one sensor (mechanical contact or optical reading head) for each digit of a code. More specifically, in order to encode the angle of rotation of a shaft within a range of 22.5 degrees of arc, for example, a 4-digit, 16-word code is required. A converter with a 4-digit readout capacity has heretofore necessitated a code wheel with at least four sensors (contacts or optical reading heads) and four distinct and segmented code rings respectively associated therewith.

As is well known, the resolution that can be obtained with a code converter is theoretically proportional to the diameter of the code wheel (or disk). Practical manufacturing considerations often impose an upper limit on the size of a code wheel and these, in turn, often limit the degree of resolution, or code converting capacity, that might otherwise be considered possible with a given size wheel. In addition, inertia and flatness considerations normally offset the improved resolution made possible by relatively large diameter code wheels. In electron beam coders, difficulties are often encountered in effecting accurate scanning of a sheet beam, for example, through a finely apertured code mask. This often tends to limit the minimum usable size of the apertures and, hence, the degree of resolution obtainable with a given size mask.

It is therefore a more specific object of this invention to improve the code converting capacity of a device having a code bearing member of fixed size, or alternatively, to improve the resolution of such a device, through a unique simplification of the code member and the utilization of a unique arrangement of multiple and offset readout points.

In accordance with the principles of the present invention, in one illustrative embodiment, an analog-to-digital mechanical scanning code converter affords readout of a four-digit binary code word, for example, with only two code rings and two spaced pairs of contacts. In a preferred arrangement, the two pairs of contacts are offset 90 degrees. As opposed to the ordinary converter wherein a separate code ring and contact are required for each digit of a binary code, the arrangement of the present invention yields a substantial improvement in the resolution of a code wheel of fixed size; in short, with multiple and spaced readout contacts, fewer rings and segments are required for the same resolution. Concomitantly, such an arrangement noticeably increases the information conversion capacity of a code wheel of fixed size and fixed number of segmented rings.

Advantageously, the principles involved in offsetting the contacts 90 degrees in the 2-ring, 4-contact code wheel, may, for example, advantageously be extended to the $n$ ring case in which at least two sets of $n$ offset contacts are associated with each code wheel. Each set of $n$ contacts, each contact being associated with a different ring on the code wheel, may, in most cases, be separated from the other set by 90 degrees. By way of example, a 3-ring code converter constructed in accordance with the invention has at least two sets of three readout contacts, in which the three contacts in one set are separated from the three contacts in the other set by 90 degrees, so that the code converter of this invention provides 64 bits of binary encoded information with only three code rings and six readout contacts.

The aforementioned principles also make possible an increase in the information conversion capacity or the simplification of a code bearing member in optical and electron beam scanning code converters, or both. For example, in an optical scanner, the code wheel is made light-sensitive and the offset mechanical contacts utilized in a mechanical scanner are replaced with optical reading units or sensors. Similarly, in electron beam coders, two properly spaced and tracked sheet beams, for example, are employed instead of one. Such beams are preferably alternately blanked so that common target electrodes may be utilized to provide digital readout from both beams.

Significantly, all of the converters embodied herein translate analog or time-variable information into a cyclic or reflected binary code. As will presently be shown, reference to a cyclic or reflected binary code as used herein does not imply the usual symmetrical pattern built up in the conventional reflected manner, but rather, refers broadly to a code wherein only one digit at a time is changed when going from one consecutively numbered bit of information to the next higher number. Such a code as compared to a straight binary code, for example, greatly adds to the accuracy of any system because operational errors are considerably reduced.

A complete understanding of this invention and of these and other features thereof may be gained from a consideration of the following detailed description taken in conjunction with the accompanying drawing, in which:

FIG. 3 is a table showing the binary readout sequences of the code converters depicted in FIGS. 1 and 2;

In accordance with the present invention, the resolution of a given code bearing member is substantially improved both by uniquely positioning the code segments (or sensing areas) and by utilizing at least two properly spaced sensors to read, simultaneously, at least two code symbols from each of a number of scanned positions on the code member.

Figure 1:
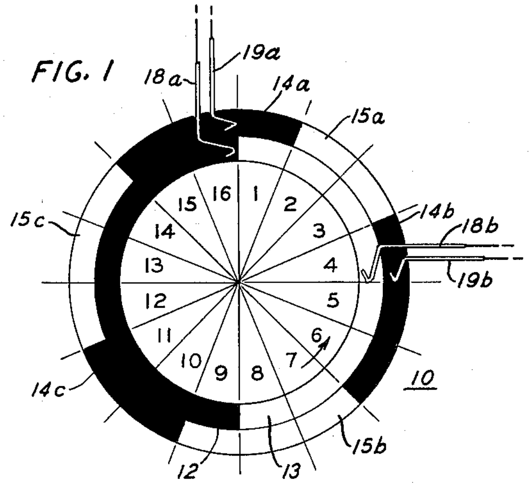
FIGS. 1 and 2 are schematic views of rotatable scanning code converters in accordance with the principles of the invention.

Considering the invention more particularly, as related to mechanical or optical code converters, FIG. 1 depicts a 2-ring, 4-digit code wheel 10, wherein an inner ring comprises a 180-degree arcuate segment 12, shown in black, and a 180-degree arcuate segment 13, shown in white. The outer ring comprises three black segments 14*a, b* and *c*, and three white segments 15*a, b* and *c*. Inasmuch as the various code wheel patterns embodied herein are applicable for use in either mechanical or optical scanners, the black segments are herein intended to represent either conducting or opaque material and the white segments are to represent either insulating or transparent material. As such, reference to the segments hereinafter will generally be only by their color rather then by their physical or electrical characteristics. In addition, it is to be understood that all references to mechanical contacts and their spacings apply equally well to optical reading elements and their spacings, as depicted, for example, in FIGS. 5 and 5A.

Associated with the inner and outer rings of wheel 10 in FIG. 1 are two pairs of contacts 18*a*, 18*b*, and 19*a*, 19*b*, respectively, with the two pairs spaced 90 degrees apart. The 90-degree readout spacing is essential for the first or inner code ring; that is, for the ring representative of the most significant digit of a cyclic or reflected code. An alternate readout spacing of 180 degrees is possible, however, for the second or outer code ring, and, as will presently be seen, the number of possible spacings increases as the number of code rings increases.

The spacing between the two contacts 18*a* and 18*b* associated with the inner ring makes possible the readout of four distinct binary words for each complete revolution of the code wheel. For purposes of illustration, each black segment is intended to represent a "1," and each white segment is intended to represent a "0" when adjacent a readout point, in accordance with conventional binary nomenclautre. The binary words read out of the inner ring may then be designated, for the direction of rotation indicated, as 00, 01, 11, and 10. A closer examination will satisfy one that two-quarters of the first ring must be black and two-quarters white in order to provide the four desired words. Moreover, it can easily be shown that the two black segments must be together to form an integral arcuate segment. If they are not, only the words 10 and 01 are obtained for a 90 degrees separation between the readout points, and the transition between words would violate the desired reflected or cyclic form of binary code readout. Similarly, if contact 18*b* were spaced 180 degrees from contact 18*a*, only the words 11 and 00 or 10 and 01 would be obtained, depending on the positioning of the black and white segments. Accordingly, the code pattern shown for the inner ring, representative of the most significant digits, comprises the only possible pattern which will provide 2-digit, 4-word readout of analog information.

The specific arrangement of the code segments and the possible spacing intervals for the contacts in the second, or outer, code ring will now be considered. In the following discussion, contacts 18*a*, 18*b*, 19*a* and 19*b* will represent successively and respectively the four digits of each code word, that is, contacts 18*a*, 18*b*, 19*a*, and 19*b* respectively represent the first, second, third, and fourth digits of each 4-digit code word. The digits associated with any given code ring may thus be considered to form subcode words which bear a definite relationship to those of the outer rings. For example, it is elementary that a full 4-digit, 16-word code will have four 2-digit subcode words in the second code ring for every 2-digit subcode word in the first code ring. Accordingly, for each 90 degrees of rotation of the code wheel 10 of FIG. 1, readout of all four subcode words in the outer ring must take place during the readout of a single subcode word in the inner ring. Contacts 19*a* and 19*b* (representative of digits 3 and 4, respectively, in a 4-digit code word) therefore will each be in contact with a black segment twice and in contact with a white segment twice during each 90 degrees of rotation of the code wheel. For purposes of explanation, the arc length of a code segment in any ring of FIG. 1 will be defined in terms of the arc length between adjacent radials which divide the code wheel into 16 equal (22.5 degrees) sectors.

Significantly, it has been found that there are limitations imposed on how the black and white segments in the second ring can be arranged if the advantages and features of the instant invention are to be realized. Specifically, a black-white-black-white sequence of segments (and its counterpart white-black-white-black) for the four successive sectors in each quadrant is ruled out, since to complete the subcode words in a given quadrant would require simultaneous changes in the digits read out with contacts 19*a*, 19*b*. Such a sequence of segments would thus be contrary to the reflected code principle. There are, however, four other possible arrangements of two black and two white segments for any quadrant of the second code ring. They are: 1100, 0011, 1001, and 0110. Any one of these code patterns can be used in the first quadrant. However, after one pattern is selected in the first quadrant, there are restraints which dictate a precise and unique arrangement of the remaining segments in the other three quadrants in accordance with the invention.

Specifically, there is only one allowable sequence for the segments in the last three quadrants of the second ring after one of the four permissible sequences is chosen for the first quadrant. By way of example, consider the segment sequence 1001 (black-white-white-black) for the first quadrant (sectors 1–4) of the outer ring of code wheel 10. With such a sequence, sector 5 of the outer ring must comprise a segment of the same color as sector 4. This is dictated both by reflected binary code limitations and by the fact that either the first or second digit (of the complete word) changes at the 90-degree rotation points in the inner code ring. Accordingly, adjacent segments in the following sectors must also correspond in color: 8 to 9, 12 to 13, and 16 to 1. The subcode word 11 in the second ring is thus established by contacts 19*a* and 19*b* both being associated with black segments in sectors 1 and 5. Since the next subcode word 01 in the second ring necessitates a color change in the segment (sector 2) associated with contact 19*a*, there must be no color change in the segment (sector 6) associated with contact 19*b*. Thus, sector 6 includes a black segment as does sector 5. For the next subcode word 00 (sectors 3 and 7), contact 19*a* is again associated with a white segment, but contact 19*b* signifies a fourth digit change in going from a black to white segment. Similarly, for subcode word 10 (sectors 4 and 8), contact 19*a* signifies a third digit change in going from a white to black segment, whereas contact 19*b* remains associated with a white segment in sector 8, as in sector 7. The first subcode word 10 (sectors 5 and 9) must not result in a color change in the outer ring, as there is a digit change which takes place in the inner ring (180 degrees translation point). The same step-by-step analysis for the third and fourth quadrants of the second ring verifies that there is no alternative pattern possible with the code sequence 1001 utilized in the first quadrant. This particular pattern is dictated both by the reflected form of binary readout employed and by the unique offset spacing of at least two readout points employed in accordance with the invention.

A complete 4-digit, 16-word readout sequence of the 16 possible shaft positions of code wheel 10, limited to the ranges identified by the numerically numbered sectors, is shown in tabulated form in FIG. 3. The columns designated "inner ring" and "second ring" list in sequence the four digits read out of code wheel 10 for one complete revolution. The column designated "outer ring" lists in sequence the fifth and sixth digits read out of the 3-ring code wheel depicted in FIG. 2, which will be discussed in detail hereinafter.

The above code pattern requirement, applicable to a 90-degree spacing of contacts 19*a* and 19*b* associated with the second code ring, also apply to a spacing interval of 180 degrees. There are two possible patterns for this spacing interval, one being the mirror image of the other, with the only variants being in the starting positions. More specifically, the same limitations which eliminate the 1010 and the 0101 segment sequence in the first quadrant of the second ring for the 90-degree readout spacing interval, also eliminate those sequences for the 180-degree readout spacing interval. If the sequence 1001 (black-white-white-black) is selected for the first quadrant of the second ring, as depicted, for example, it can then be shown that the arbitrary selection of either a black or white segment for sector 9 uses up all of the possible degrees of freedom. This follows from the fact that as for the case of 90-degree spacing between readout points, the color of the segments in sectors 1 and 16, 4 and 5, 8 and 9, and 12 and 13 must be of the same matching colors, respectively. For a readout spacing of 180 degrees, subcode words will be formed when contacts 19*a* and 19*b* are respectively associated with segments in sectors 1 and 9, 2 and 10, 3 and 11, et cetera.

If the segment in sector 9 is changed from white, as shown, to black, the resulting code pattern in the second ring is simply rotated clockwise 90 degrees, relative to the pattern formed with a white segment in sector 9. Similarly, if the code sequence of 0110 (rather than 1001) is used in the first quadrant, the same pattern is obtained with the black and white segments simply being reversed.

While there has been shown to be two permissible spacings for the readout points in the second ring of code wheel 10, there are eight possible readout spacings if a third ring is employed. If four code rings are utilized, there are 32 possible readout spacings. Accordingly, it may be stated that after the first code ring (or array), there are always half as many possible readout points in a given ring as there are total segments (or sensing areas) in the preceding ring.

Figure 2:
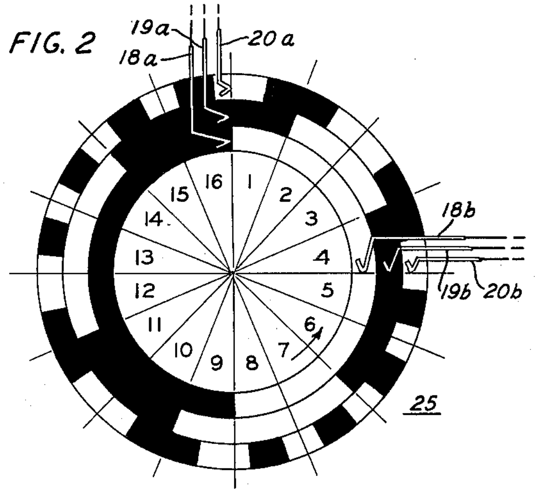

This is most clearly seen from an examination of FIG. 2 which depicts a three-ring code wheel 25 embodying features of the invention. Associated with the third ring are two readout contacts 20*a* and 20*b* spaced 90 degrees apart for purposes of illustration. As the patterns for the first and second rings are established as described for code wheel 10 in FIG. 1, reference will be made primarily to the code pattern in the third ring. Each $\frac{1}{16}$ sector of code wheel 25 should be visualized as further subdivided into four parts, each of which identifies an arcuate segment measuring $\frac{1}{64}$ of a revolution in the third ring. The four resulting segments in each $\frac{1}{16}$ sector will then be further defined as comprising either a symmetrical pattern, S (black-white-white-black or vice versa) or a nonsymmetrical pattern (black-black-white-white or vice versa). As much, the following rules apply with respect to the code pattern in the third ring in accordance with the principles of the invention:

(1) Each $\frac{1}{16}$ sector must contain two black and two white segments.

(2) The sequence black-white-black-white is not permissible.

(3) The last segment in any $\frac{1}{16}$ sector must always be of a color which agrees with the first segment in the succeeding $\frac{1}{16}$ sector.

(4) After the space between pickup points is filled with an appropriate pattern, there are no other degrees of freedom.

(5) Any sequence of black and white segments formulating a reflected form of binary readout with a given separation between the readout points must complete itself in one revolution, or in a submultiple of 16 equally divided sectors of the code wheel.

(6) An acceptable color pattern requires that a nonsymmetrical color sequence, e.g., 0011 or 1100, at first contact 20*a*, for example, must be matched by a symmetrical color sequence, e.g., 0110 or 1001 at the second contact 20*b*, for example, or vice versa.

Consider now the derivation of an acceptable color pattern for the third ring for various spacing intervals of contacts 20*a* and 20*b*. For odd spacing arcuate intervals of $\frac{1}{16}$, $\frac{3}{16}$, $\frac{5}{16}$, and $\frac{7}{16}$ between the readout points, an alternating sequence of symmetrical (S) and nonsymmetrical (N) groups (or vice versa) satisfies the requirements of rule 6 and can be generalized as follows: SNSNSNSN, et cetera. When the other listed requirements are also fulfilled, a unique color pattern (as distinguished from the final code pattern) solution may be derived. By arbitrarily starting with an S group at the first contact, a portion of the color pattern, represented by digits, is formed as follows: 0110, 0011, 1001, 1100, 0110, et cetera. This particular sequence is the only one that satisfies the $\frac{1}{16}$, $\frac{3}{16}$, $\frac{5}{16}$, and $\frac{7}{16}$ readout spacing intervals. Since all allowable groupings appear in an invariant sequence, the only variation is in the starting position. For the $\frac{3}{16}$, $\frac{5}{16}$, and $\frac{7}{16}$ spacing intervals, it can be shown that the only other arrangements of symmetrical and nonsymmetrical group sequences that satisfy rule 6 will violate rule 5. The codes generated for the different odd $\frac{1}{16}$ pickup spacing intervals will differ, but each advantageously will provide reflected binary code readout.

For the even numbered $\frac{1}{16}$ spacing intervals between the readout points, it can be shown that the $\frac{2}{16}$ and $\frac{6}{16}$ spacing intervals are satisfied by only one group sequence. Expressed as symmetrical and nonsymmetrical groups, the overall group pattern must take the form: SSNNSSNN, et cetera. This group sequence is dictated by rule 6 which requires a color alternation for successive $\frac{6}{16}$ spacing intervals, e.g. between the 1st, 7th, 13th, 19th (3rd), 9th, 15th, et cetera. For the $\frac{2}{16}$ spacing interval between readout points, the same group sequence is employed. In accordance with the above listed requirements, the $\frac{2}{16}$ and $\frac{6}{16}$ readout spacing intervals in the third ring give rise to the following color patterns, arbitrarily starting with two "S" groups: 0110, 0110, 0011, 1100, 0110, et cetera and its mirror image. Note that rule 5 requires that when symmetrical groups are adjacent each other, they must be identical. When two nonsymmetrical groups are adjacent each other, one is the mirror image of the other.

The $\frac{4}{16}$ spacing interval (90 degrees), as shown in FIG. 2, is derived easily from the symmetrical and nonsymmetrical group analysis. It can be shown that the following group patterns are permissible:

(1) SSSSNNNNSSSS et cetera or (2) SSNSNNNSNSSNS, et cetera. For the first listed group sequence, starting with four "N" groups as depicted at contact 20*a*, the following color pattern is developed: 0011, 1100, 0011, 1100, 0110, 0110, 0110, 0110, 0011, et cetera, or its mirror image. For the second listed group sequence, the following code pattern is generated: 0110, 0110, 0011, 1001, 1100, 0011, 1001, 1100, 0110, et cetera, or its mirror image.

For the $\frac{8}{16}$ readout spacing interval (180 degrees), the symmetrical-nonsymmetrical pattern results in a variety of code group sequences which are straightforward and a complete listing is not believed necessary herein. By way of example, eight symmetrical groups followed by eight nonsymmetrical groups constitutes one possible sequence. Other group sequences are

SNSNSNSNNSNSNSNS et cetera, SSSNNSSSNNNSSNNN, et cetera, and

SSNNSNSSNNSSNSNN et cetera, to list but a few. A complete 6-digit, 64-word readout sequence of the 64 possible shaft positions of code wheel 25, is shown in tabulated form in FIG. 3.

Extending the analysis further verifies that there are 32 acceptable spacings for the readout points in a fourth code ring. The code group sequence SNSNSN, et cetera, is necessary for and satisfies all of the odd numbered spacing intervals from $\frac{1}{32}$ through $\frac{31}{32}$ divisions in a fourth ring of a code wheel. Likewise, a sequence of SSNNSSNN, et cetera, will satisfy the intervals $\frac{2}{32}$, $\frac{6}{32}$, $\frac{10}{32}$ and $\frac{14}{32}$. For the other even numbered intervals, the number of possible code group sequences increases as they did for the corresponding intervals on the third code ring. It is obvious that the analysis of the code pattern sequences set forth herein may be extended to any number of $n$ rings (or rows) of code segments (or sensing areas).

The foregoing examination relating to the unique offset spacing of the readout points clearly establishes that a prior art code wheel adapted for conventional reflected binary codes will not satisfy the requirements imposed on the code pattern for offset readout in accordance with the principles of this invention. Specifically, in a code converter adapted for conventional reflected binary readout, digits 3 and 4 (represented by the two readout points on the second ring) would not successively go through the same sequence of color variations as successive words of the code would be read out. In accordance with the present invention, the offset spacing of the readout units necessitates that they successively "see" the same identical sequence or code pattern as successive words are read out. It is thus seen that in addition to the unique offset spacing of the readout points, the code patterns which make a modified form of reflected binary readout possible are also unique.

Figure 4:
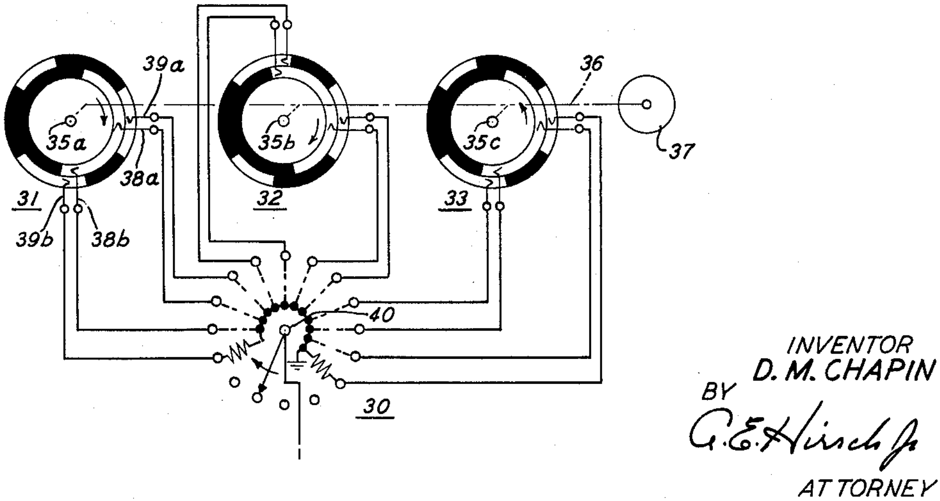
FIG. 4 is a schematic view of a plurality of scanning code converters interconnected to provide analog-to-digital conversion of a number of data channels in accordance with the invention.

FIG. 4 depicts an analog-to-digital code converting system 30 comprising, for purposes of illustration, three code wheels 31, 32 and 33, which may be considered as mechanically coupled to three shafts 35*a*, *b* and *c*, representative, for example, of the tens, hundreds and thousands units of a suitable gear train in a well known manner. Such coupling is represented by the dashed line 36 associated with a rotatable source 37, which may comprise a motor.

As previously noted, the spacing of the two readout contacts 38*a* and 38*b* associated with the inner ring of each wheel is critical, necessitating a specific spacing of 90 degrees. As also previously noted, contacts 39*a* and 39*b* associated with the outer ring of each code wheel may be spaced apart either 90 degrees, as shown in FIG. 4, or 180 degrees. Since only two code rings are required to provide 16 bits of rotational information, the code wheels in FIG. 4 may be considerably smaller than conventional code wheels of the same data capacity. Their smaller dimensions make them ideally suited for use in reading dials or the like in apparatus having limited available space, such as utility meters, for example.

In such applications, the four output leads of each code wheel provide information indicative of the momentary angular position (out of 16 resolvable ones) of the wheel. A rotary switch 40 having only 12 contact positions, for example, may then be actuated by suitable means (not shown) successively to read out the information. Of course, considerably more analog-to-digital information could be read out of a mechanical or optical scanning system of the type depicted in FIG. 4 if each code wheel comprised more than two segmented rings.

Figure 5:
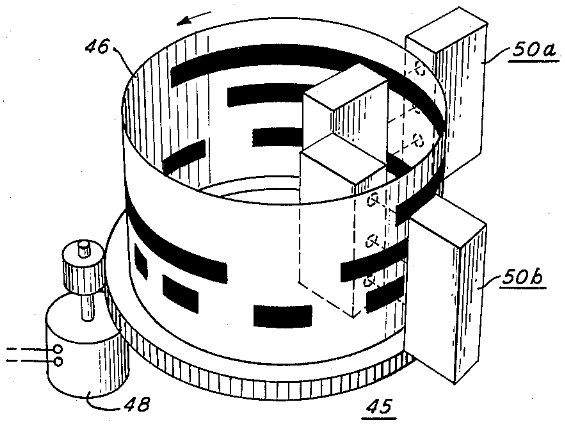
FIGS. 5 and 5A are perspective and sectional views of an optical code converter and an optical reading unit therefor, respectively, in accordance with principles of the invention.

FIG. 5 depicts an optical scanning code converter 45 which utilizes a cylindrical code bearing member 46.

As such, the black sensing areas of the cylinder may be considered as opaque and the white sensing areas as transparent in each circumferentially disposed code ring. The code pattern formed in cylinder 46 may be identical to the one depicted on the 3-ring code wheel 25 of FIG. 2. Mechanically coupled to the cylindrical member 46 is a signal responsive, rotatable device 48, which, by way of example, is depicted as a motor.

Figure 5A:
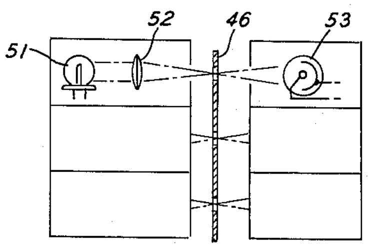

Two optical reading units 50*a* and 50*b* are associated, respectively, with each of the three code rings. As depicted in FIG. 5A, each of these reading units may comprise a light source 51 and a focusing lens 52 on one side of the code member 46 and a light responsive element 53, such as a photo cell, on the opposite side of member 46. The analog-to-digital information is thus read out at the output terminals of the photo cells in a well known manner.

In accordance with the invention, the respective pairs of optical readout units, 50*a* and 50*b*, for example, associated with each code ring, are spaced apart a distance corresponding to one-half the arcuate length of the largest sensing area in the upper ring. The optical readout units in the middle ring may be spaced apart either 90 degrees as shown or 180 degrees. Additional readout spacing intervals for the units in the third, and for any other rings, may be determined in the same manner as set forth in the discussion of the code wheels depicted in FIGS. 1 and 2.

By reason of the unique offset readout principles of the invention, optical scanner 45 makes possible 6-digit, 64-word readout with a smaller and more simplified code cylinder and with a higher degree of resolution than is possible with prior converters exhibiting the same readout capacity.

It has been found that the principles of the invention applicable to mechanical or optical scanners depicted in FIGS. 1, 2, 4 and 5, also apply to electron beam coders. Accordingly, the underlying concepts which have been shown to make possible a substantial simplification in the code bearing element of a mechanical or optical scanner with no appreciable sacrifice in readout capacity, also effect similar results in electron beam coders.

As is well known, problems such as inertia effects, mechanical design limitations, alignment difficulties, et cetera, impose restrictions on rotatable code wheels or cylinders, especially when employed for high speed-high data conversion applications. Beam coders, however, either eliminate or substantially reduce many of the aforementioned problems. Specifically, higher resolution is obtained with beam coders because the writing beam can be many orders of magnitude smaller (sometimes over one hundred times smaller) in size than optical, magnetic or mechanical readout means. Other advantages of beam coders over optical or mechanical scanners include: the elimination of any appreciable inertia effects which primarily make possible the higher writing and storage speeds; and direct readout in the form of electrical signals. It is thus seen that a beam coder utilizing two properly spaced beams instead of one for readout and an apertured code plate adapted for dual beam use in accordance with the principles of this invention, result in a device particularly well suited for very high speed and highly accurate signal conversion applications.

Figure 6A:
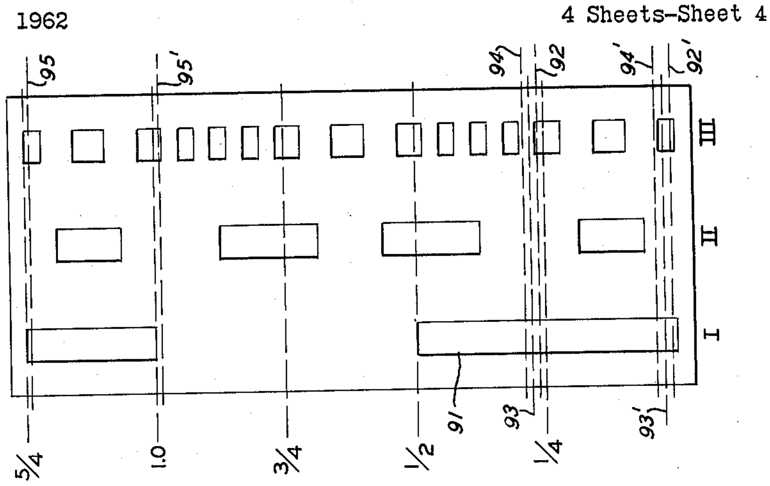
FIG. 6A is a schematic representation of the code bearing member used in the code converter apparatus of FIG. 6.
Figure 6:
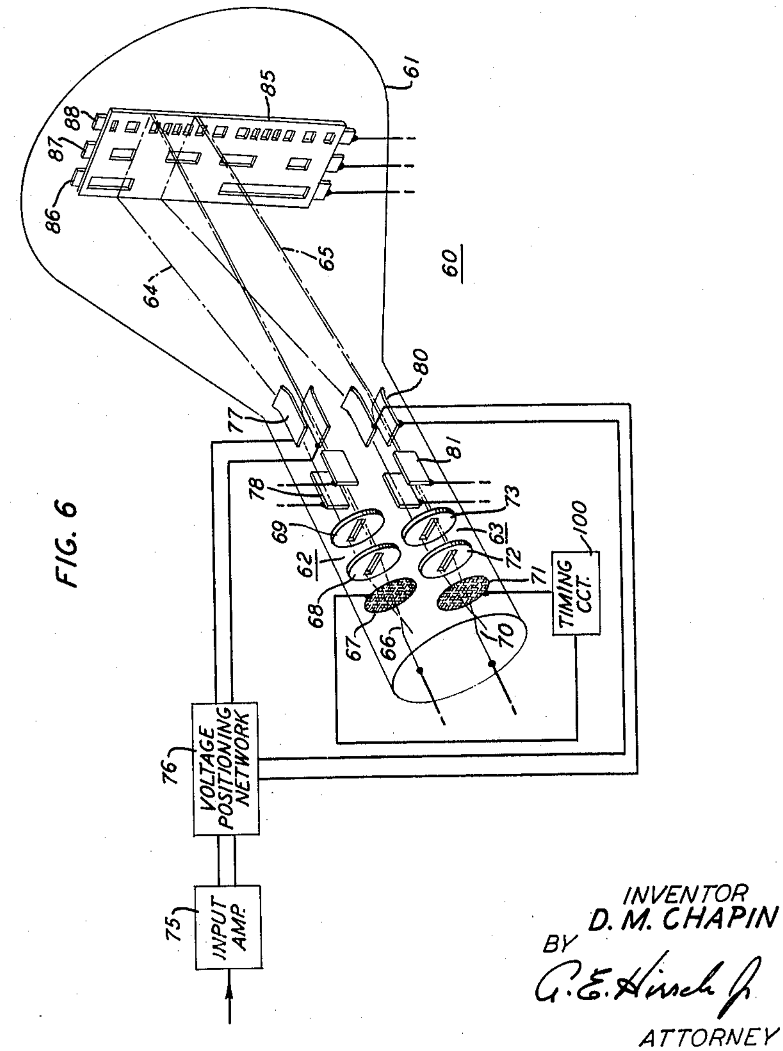
FIG. 6 is a perspective view of an electron beam code converter embodying principles of the invention.

FIG. 6 depicts an electron beam coder 60 comprising an evacuated envelope 61 having therein two electron guns 62 and 63 for producing, respectively, two properly spaced and tracked electron beams 64 and 65. Electron gun 62 comprises a cathode 66, control grid 67, and beam forming and accelerating electrodes 68 and 69, respectively. Similarly, gun 63 comprises a cathode 70, control grid 71, and beam forming and accelerating electrodes 72 and 73, respectively. These elements of the tube are connected to suitable sources (not shown) in a conventional manner and operate to form the two ribbon beams 64 and 65 extending in the plane defined by the slitted apertures in the electrodes 68, 69 and 72, 73, respectively.

The input signal wave to be encoded is applied through an amplifier 75 and a signal voltage positioning network 76 to a pair of vertical deflection plates 77 associated with gun 62. A suitable voltage applied to a pair of horizontal deflection plates 78 controls the horizontal position of the beam 64 and normally remains fixed. The signal output from amplifier 75 is also applied through the signal voltage positioning network 76 to a pair of vertical deflection plates 80 associated with gun 63. The signal voltage positioning network 76 may comprise any well known resistance network for causing the beam 65, generated by gun 63, to track the beam 64, generated by gun 62, by a predetermined displacement. A suitable voltage applied to a pair of horizontal deflection plates 81 controls the horizontal movement of the beam 65 and also normally remains fixed.

In order to illustrate the application of the principles of the invention, a code bearing member 85, hereinafter referred to as the code plate, is shown positioned within the evacuated envelope 61. It is adapted to provide a form of reflected binary code readout in accordance with the principles of the invention discussed above. The beams 64 and 65 are deflected by the same input signal, but displaced a predetermined distance by a difference in the direct current potentials applied to the two pairs of vertical deflection plates 77 and 80. The appropriate positioning potentials are applied to these deflection plates in the manner which is standard practice for single beam coder tubes. The result of such dual beam focusing is that beams 64 and 65 are caused to impinge upon certain ones of a set of target electrodes 86–88 in different unique combinations corresponding to the different digits of the code. The beams also successively and selectively establish on the target electrodes pulses representative of the digits of the code.

Inasmuch as beams 64 and 65 would often strike the same target at the same time if operated simultaneously, thereby making it extremely difficult to separate the code characters severally produced for each word by the two beams, a timing circuit 100 is utilized to blank the beams alternately. With such a circuit, the first three digits of each code word simultaneously read out in conjunction with beam 64, for example, may be delayed, or stored, and subsequently added to the second three digits of each code word simultaneously read out in conjunction with beam 65.

For this purpose a bias voltage is normally applied to the control grids 67 and 71 to prevent the formation of beams 64 and 65. The timing circuit 100 is constructed to switch the beams on alternately at predetermined intervals which are short enough to provide accurate binary encoding of a given value of signal voltage applied to the device. Thus, when a code word is to be produced, a positive pulse from timing circuit 100 of such amplitude as to overcome the cutoff bias of gun 62 is applied first to control grid 67, for example. This permits the formation of beam 64 which impinges upon code plate 85 at a position determined by and indicative of the amplitude of the message signal then applied to deflection plates 77. A subsequent positive pulse from the timing circuit 100 is then applied to control grid 71. Beam 65 is then formed which likewise impinges upon coding plate 85 at a position also determined by and indicative of the amplitude of the message signal applied to deflection plates 80.

In accordance with the invention, beam 65 is spaced below the point of first beam impingement by one-half the distance of the largest aperture in row I of code plate 85. As a result, the output leads from collectors 86, 87 and 88 carry pulses of current of relative amplitudes of "0" or "1" dependent upon the values and sequence of the code characters required for the representation of that particular signal amplitude applied to the device.

FIG. 6A shows in greater detail the apertured code patterns in plate 85. In accordance with the invention, each of the three rows of apertures depicted gives rise to two different digits of a 6-digit, 64-bit reflected binary code. The two digits in each row are established by both beams impinging upon sensing areas of each row. Hence, coder 60 provides six digits of binary information per code word, and 64 different words of information can be generated by causing both beams to scan a distance equal to twice the height of the largest aperture in column I. If only one beam were employed as in conventional beam coders, each row of apertures would represent but a single digit and, hence, only eight words of binary information could normally be read out of coder 60. In addition, coder 60 exhibits a higher degree of resolution than is possible with a conventional coder utilizing six rows of apertures to achieve the same readout capacity.

As seen in FIG. 6A, the code apertures in rows II and III differ not only in size, but in the spacing intervals. This unique code pattern is a counterpart of the 3-ring code pattern depicted in FIG. 2 and is required for multi-offset readout as employed in the devices of the present invention. In reading out information with code plate 85, the two beams 64, 65, are spaced apart a distance equal to one-half the length of the most significant code aperture 91 in row I. This distance equals one-fourth of the "regular" length of each row (equivalent to 90 degrees on a code wheel). As will presently be seen, the "regular" length of each row comprises only four-fifths of the total length.

In order to allow both beams 64 and 65 to scan the regular code bearing area of plate 85, the lower one-quarter section of this area, indicated up to the horizontal line "¼," is duplicated above the horizontal line designated "1.0." This extension of the regular code bearing area allows beam 64 to impinge upon the code plate along a given horizontal line in the duplicated section, i.e., between the lines "1.0" and "5⁄4," immediately before or after beam 65 impinges on the code plate along a horizontal line, properly spaced from the first mentioned line, in the section between lines "¾" and "1.0." The code plate extension thus allows both beams to scan selectively a regular code bearing area in response to signal values ranging from 0 to 64.

If it is assumed that either beam in passing through an aperture in any row and impinging upon a target electrode establishes a "1" in that row, and that the absence of such impingement establishes a "0," in accordance with conventional binary nomenclature, a six-digit reflected binary code may be formulated as follows: If the first signal amplitude to be represented in code form is taken as "zero," the corresponding binary code word may be established when beam 64 coincides with a horizontal line 92 (in FIG. 6A), and when beam 65 coincides with a horizontal line 92'. The code word for this signal value may thus be written as 110011. The first, third and fifth code characters (1–0–1–) are established by beam 64 impinging on targets 86 and 88 (as seen in FIG. 6), but not on target 87. The last three digits, second, fourth and sixth (–1–0–1), are established by beam 65 impinging upon both targets 86 and 88. The next binary code word, corresponding to a signal amplitude of "one," for example, is produced when beams 64 and 65 coincide with the horizontal lines 93 and 93', respectively. The resulting code word representative of this signal value is 100101. Similarly, the binary code word representative of the signal value "two" is defined when beams 64 and 65 coincide with the horizontal lines 94 and 94', respectively. The binary code word read out at this location is 100100.

The remaining code words are read out in a similar manner as the two beams respectively scan the various apertures in the three rows in a sequence dependent on the amplitude of the input signal. Thus, for example, beams 64 and 65 will read out a code word 101001 representative of a signal value of "sixty-three" when they respectively impinge upon the horizontal lines 95, 95'.

It is apparent that four or more rows of code apertures may be utilized in a coder of the type depicted in FIG. 5, if arranged in a sequence as set forth in regard to the description of the code wheels of FIGS. 1 and 2.

It is also apparent, of course, that a cylindrical code bearing member, as depicted in FIG. 5, for example, may be employed in place of the planar code plate 85. With such a code member, the magnetic focusing field may be made responsive to the amplitude of a time-variable signal in any desired fashion to cause two electron beams generated from an axially positioned continuous cathode, for example, to scan the cylindrical member with one beam tracking the other by one-half the distance of the sensing area representative of the most significant digit of the code.

As noted above, the output pulses produced by each beam in coder 60 often occur simultaneously on either two or all three of the target electrodes. It may often be desired to transmit such encoded information in the form of discrete pulses which may then be distributed in time for transmission over a single channel, or transmitted separately and simultaneously over different channels interleaved with pulses from other sources, as, for example, additional beam coders, representing other message signals. For such purposes, any suitable form of distributor, e.g., delay lines, may be associated with the target electrodes. A suitable distributor for such purposes is disclosed in U.S. Patent 2,602,158 of R. L. Carbrey, issued July 1, 1952.

Coder 60 may also be used for ternary readout, if, for example, pulse weighting circuits associated with the targets 86–88 are employed as disclosed in the aforementioned patent of Carbrey.

In summary, it has been shown that coders utilizing a unique form of multi-offset readout and a code bearing member peculiarly adapted for such readout, provides important advantages over prior art coders. Among these are: effectively increased code conversion capacity, and/or code member simplicity. Moreover, it has been shown that the advantages and features embodied herein are equally applicable to coders utilizing either mechanical, optical or beam scanning. Finally, in all of these coders, a low error rate of analog-to-digital signal conversion is effected by utilizing a modified form of reflected or cyclic binary readout.

It is to be understood that the specific embodiments described herein are merely illustrative of the general principles of the instant invention. Numerous other structural arrangements and modifications may be devised in the light of this disclosure by those skilled in the art, without departing from the spirit and scope of this invention.

What is claimed is:

1. A code converter comprising a code mask having a plurality of $n$ sensing areas each exhibiting at least two distinct characteristics, where $n$ is a selected positive integer, said areas being selectively arranged in size and position to permit time-variable information represented by an incoming signal applied to said code mask to be converted into a predetermined reflected binary code having $2n$ digits in each code word, and means for scanning said code mask to derive from each of said $n$ sensing areas a corresponding group of two code signals representative of said time-variable information so that said time-variable information is represented by $2n$ code signals corresponding to said $2n$ digits in each code word, wherein said two code signals in each group are derived from two distinct points in said corresponding sensing area, and wherein the most significant group of two code signals are derived from two points which are spaced apart a distance approximately equal to one-half the largest dimension of that one of said two distinct characteristics of said sensing areas which is representative of the most significant element of said code.

2. A coder comprising a code bearing member having a plurality of $n$ sensing areas, where $n$ is a selected positive integer, each of said areas exhibiting at least two distinct characteristics, said areas being selectively arranged in size and position to permit time-variable information represented by an incoming signal to be converted into a reflected digital code having $2n$ digits in each code word, and scanning means responsive to said incoming signal for deriving from each of said $n$ sensing areas a corresponding group of at least two code signals representative of said time-variable information so that said time-variable information is represented by $2n$ code signals corresponding to said $2n$ digits in each code word, wherein said code signals in each group are derived from points in said corresponding sensing area which are spaced apart by selected distances, and wherein the most significant group of code signals is derived from points which are spaced apart by a distance approximately equal to one-half the largest dimension of that one of said two distinct characteristics of said sensing areas which is representative of the most significant digit of said digital code.

3. A coder in accordance with claim 2 wherein said code bearing member is rotatable and has at least one code sensing area comprising segments of conductive and nonconductive material, respectively; and wherein said scanning means comprises means for rotating said code wheel in response to said incoming signal information, and at least two readout means associated with each of said sensing areas, wherein each readout means comprises an electrical contact.

4. A coder in accordance with claim 3 wherein said rotatable code bearing member comprises a code wheel.

5. A coder in accordance with claim 3 wherein said code bearing member comprises a cylinder.

6. A coder in accordance with claim 2 wherein said code bearing member is rotatable and each code sensing area comprises segments of opaque and transparent material, respectively; wherein said scanning means comprises means for rotating said code wheel in response to said incoming signal, and readout means which comprises light responsive, optical readout circuits.

7. A coder in accordance with claim 6 wherein said code bearing member comprises a code wheel.

8. A coder in accordance with claim 6 wherein said code bearing member comprises a cylinder.

9. A coder in accordance with claim 2, wherein said scanning means comprises means for generating at least two electron beams and includes target means upon which said beams selectively impinge; wherein said code bearing member having a plurality of sensing areas comprises an apertured mask, different groups of said apertures being positioned intermediate different ones of said targets and said beam generating means; and wherein said incoming signal causes said beams to scan selectively the surface of said apertured mask in accordance with a predetermined analog-to-digital code converting sequence.

10. A coder in accordance with claim 9 wherein said apertured mask comprises a planar surface area and wherein said electron beams are projected toward said mask by separate guns and separate beam deflection circuits.

11. A coder comprising a code bearing member having a plurality of $n$ sensing areas, where $n$ is a selected positive integer, each of said areas exhibiting at least two distinct characteristics, said areas being selectively arranged in size and position to permit time-variable information represented by an incoming signal to be converted into a digital code having $2n$ digits in each code word in accordance with a predetermined code sequence wherein only one digit changes at a time in progressing through consecutively numbered code words, and scanning means responsive to said incoming signal for developing from each of said sensing areas at least two coded signals to represent in said digital code said time-variable information, said scanning means including at least two sensors associated with each of said sensing areas, wherein the two sensors associated with the sensing area corresponding to the most significant digits of said code are spaced apart a distance approximately equal to one-half the largest dimension of that one of said two distinct characteristics of said associated sensing area which is representative of the most significant element of said code.

References Cited by the Examiner

UNITED STATES PATENTS

| | | | |
|---|---|---|---|
| 2,993,200 | 7/1961 | Walker et al. | 340—347 |
| 2,994,863 | 8/1961 | Trapnell | 340—347 |
| 3,022,500 | 2/1962 | Stupar | 340—347 |
| 3,130,399 | 4/1964 | Paul | 340—347 |

MALCOLM A. MORRISON, *Primary Examiner.*